United States Patent
Wieres

(10) Patent No.: US 7,383,633 B2
(45) Date of Patent: Jun. 10, 2008

(54) NON-CYLINDRICAL CATALYTIC-CONVERTER CARRIER ELEMENT AND TOOL, AND METHOD FOR MANUFACTURING IT

(75) Inventor: Ludwig Wieres, Overath (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 482 days.

(21) Appl. No.: 11/010,875

(22) Filed: Dec. 13, 2004

(65) Prior Publication Data
US 2005/0095180 A1    May 5, 2005

Related U.S. Application Data

(63) Continuation of application No. PCT/EP03/05608, filed on May 28, 2003.

(30) Foreign Application Priority Data
Jun. 13, 2002 (DE) .............................. 102 26 282

(51) Int. Cl.
   B21D 51/16    (2006.01)
   B01D 50/00    (2006.01)
(52) U.S. Cl. .................. 29/890; 29/890.036; 422/177; 422/179; 422/180; 428/116; 428/593; 502/439; 502/527.18; 502/527.23; 502/527.24
(58) Field of Classification Search ............ 29/890, 29/890.036; 422/177, 179, 180; 428/116, 428/593; 502/439, 527.18, 527.23, 527.24
See application file for complete search history.

(56) References Cited

U.S. PATENT DOCUMENTS 3,903,341 A * 9/1975 Gerhold ...................... 428/116

| | | |
|---|---|---|
| 4,282,186 A | 8/1981 | Nonnenmann et al. |
| 4,400,860 A | 8/1983 | Nonnenmann et al. |
| 4,519,120 A | 5/1985 | Nonnenmann et al. |
| 4,803,189 A | 2/1989 | Swars |
| 4,832,998 A | 5/1989 | Cyron |
| 4,923,109 A | 5/1990 | Cyron |
| 4,946,822 A | 8/1990 | Swars |
| 4,969,265 A * | 11/1990 | Ehara .......................... 29/890 |

(Continued)

FOREIGN PATENT DOCUMENTS

DE         28 56 030 A1      6/1980

(Continued)

*Primary Examiner*—David P. Bryant
*Assistant Examiner*—Alexander P Taousakis
(74) *Attorney, Agent, or Firm*—Laurence A. Greenberg; Werner H. Stemer; Ralph E. Locher

(57) ABSTRACT

A method for the production of a converter-carrier body having a metallic honeycomb body made of a plurality of metal layers, especially smooth layers and corrugated layers, the layers having layer ends, such that an outer shape of the honeycomb body is formed by the layer ends. At least one stack is produced having several alternately disposed metal layers that are structured such that channels are formed for a fluid to flow through. The at least one stack is transformed into a honeycomb body having a cylindrical form. The honeycomb body is deformed from the cylindrical form so that an outer shape that deviates from the cylindrical form is produced. Additionally, the invention relates to a corresponding converter-carrier body and a tool for the production thereof.

16 Claims, 4 Drawing Sheets

U.S. PATENT DOCUMENTS

| | | | |
|---|---|---|---|
| 5,094,997 A * | 3/1992 | Kojima et al. | 502/439 |
| 5,105,539 A | 4/1992 | Maus et al. | |
| 5,135,794 A | 8/1992 | Maus et al. | |
| 5,139,844 A | 8/1992 | Maus et al. | |
| 5,785,931 A * | 7/1998 | Maus et al. | 422/180 |
| 6,049,961 A | 4/2000 | Wieres | |
| 6,049,980 A | 4/2000 | Wieres | |
| 6,311,395 B1 | 11/2001 | Wieres | |
| 6,505,396 B1 | 1/2003 | Wieres | |
| 2001/0048904 A1 * | 12/2001 | Hayashi | 422/179 |

FOREIGN PATENT DOCUMENTS

| | | |
|---|---|---|
| DE | 41 29 824 A1 | 3/1993 |
| EP | 0 245 737 B1 | 11/1987 |
| EP | 0 831 969 B1 | 4/1998 |
| EP | 0 846 219 B1 | 6/1998 |
| WO | 90/03220 | 4/1990 |

* cited by examiner

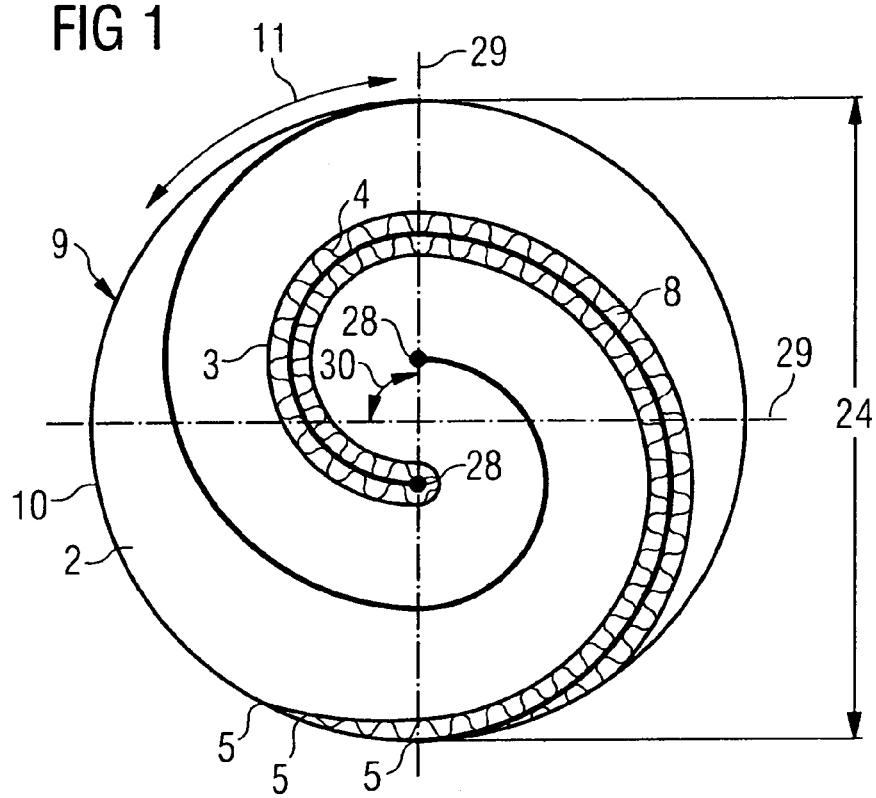
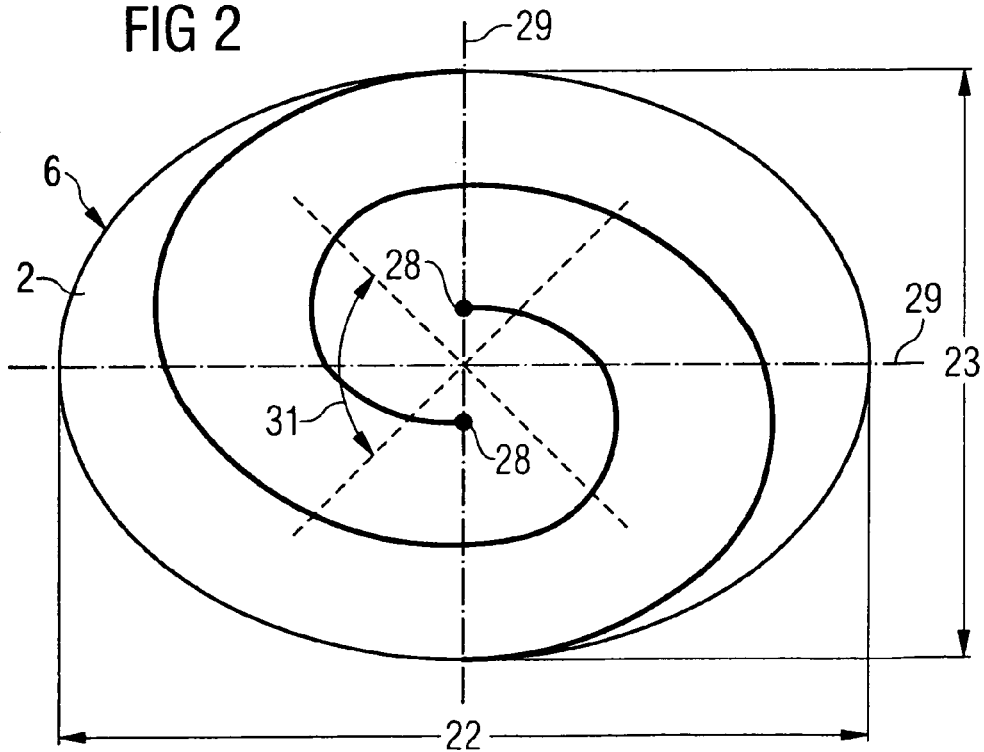

NON-CYLINDRICAL CATALYTIC-CONVERTER CARRIER ELEMENT AND TOOL, AND METHOD FOR MANUFACTURING IT

CROSS-REFERENCE TO RELATED APPLICATION

This is a continuing application, under 35 U.S.C. § 120, of copending international application No. PCT/EP03/05608, filed May 28, 2003, which designated the United States; this application also claims the priority, under 35 U.S.C. § 119, of German patent application No. 102 26 282.9, filed Jun. 13, 2002; the prior applications are herewith incorporated by reference in their entirety.

BACKGROUND OF THE INVENTION

Field of the Invention

The present invention relates to a catalytic-converter carrier element and a tool, and to a method for manufacturing it. The catalytic-converter carrier element has a metallic honeycomb element composed of a plurality of smooth layers and corrugated layers with layer ends, which are constructed such that an external shape of the honeycomb element is formed by the layer ends. Such catalytic-converter carrier elements are used, in particular, for cleaning exhaust gases of mobile internal combustion engines, for example, spark ignition engines or diesel engines, in automobile engineering. Different installation positions have proven useful when disposing such a catalytic-converter carrier element in the exhaust system of, for example, a passenger car. For example, catalytic-converter carrier bodies are disposed, for example, relatively close to the internal combustion engine, in particular, in or near to the valve outlet, in the manifold, or upstream of an exhaust gas turbocharger. Due to the narrow spatial conditions in the engine cavity or in its proximity, such catalytic-converter carrier elements are constructed with relatively small volumes (for example, with an overall volume that, preferably, corresponds to less than 20% of the cubic capacity of the internal combustion engine). Furthermore, it is known to dispose such catalytic-converter carrier elements in the region of the underbody of a passenger car. With such a configuration of the catalytic-converter carrier element, it is necessary to ensure, in particular, that the ground clearance of the automobile is not affected disadvantageously—to prevent the catalytic-converter carrier element from coming into contact with the underlying ground. To avoid this it is also known to countersink such catalytic-converter carrier elements at least partially in the underbody and/or to flatten the external shape of the catalytic-converter carrier element.

Furthermore, when such catalytic-converter carrier elements are used in the field of motorcycles, motorized saws, lawn mowers, or the like, particular embodiments are desired because, here, the available spaces are to be utilized as completely as possible due to the spatial conditions. This has the advantage that the previously mentioned devices can be made very small, compact, easy-to-handle, and lightweight, thus, considerably improving the ease of operation.

An oval catalytic-converter carrier element and a method for manufacturing it are disclosed, for example, in German Published, Non-Prosecuted Patent Application DE 28 56 030 A1 (corresponding to U.S. Pat. No. 4,519,120 to Nonnenmann et al., U.S. Pat. No. 4,400,860 to Nonnenmann et al., and U.S. Pat. No. 4,282,186 to Nonnenmann et al.). To manufacture the metallic honeycomb element, it is proposed, first, to wind metal foils in a spiral shape to form a circular-cylindrical element. To create the element, it is necessary for the ends of the metal foils on one side to be connected to a core, wherein the metal foils are disposed around the core by turning the core. The core with the metal foils that are wound thereon in a spiral shape is inserted subsequently in two half shells and affixed. The core that is located in the interior is, then, pulled out so that a hollow-cylindrical space is produced in the center of the honeycomb element. The half shells are, then, placed together so that they abut and can be directly welded or at least spot-welded in this position. When the half shells are placed together, the circular-cylindrical shape of the honeycomb element is changed such that the honeycomb element ultimately bears uniformly against the insides of the half shells. However, this requires the external diameter of the circular-cylindrical element and the internal diameter of the hollow-cylindrical space of the honeycomb element to maintain a specific relationship with one another before the half shells are placed together.

However, the catalytic-converter carrier element that is so manufactured and the method described in these publications have a number of disadvantages. For example, manufacturing the housing of the catalytic-converter carrier element with two half shells that have to be welded to one another is complex and costly, and the weld seam that is produced there may be a cause of at least partial failure of the catalytic-converter carrier element due to the high thermal and dynamic stressing that occurs in an exhaust gas system. The spiral-shaped configuration of the metal foils is also disadvantageous with respect to the vibrations that occur in the exhaust system and that are due, in particular, to the intermittent combustion process in the internal combustion engine, which vibrations result in pressure shocks that propagate periodically through the exhaust system. Due to the fact that the metal foils have a relatively long length caused by their spiral shape and that they are attached to the housing by only one metal foil end in each case, there is the risk of telescoping, that is to say, of the metal foils becoming displaced with respect to one another in the direction of flow and/or of at least parts of the metal foils becoming detached from the housing.

In such elements, it is also necessary to take into account the fact that the metal foils are subjected to enormous thermal stresses that result, for example, from the temperature of the exhaust gas itself, on one hand, the temperature increasing when the catalytic-converter carrier element is disposed more closely to the internal combustion engine. On the other hand, the chemical catalytic conversion also leads to an increase in temperature of the catalytic-converter carrier element because the element generally operates exothermally so that, under certain circumstances, temperatures are reached that are significantly higher than the exhaust gas temperature itself (over 1200° C.). Both the change in temperature and the vibration states in the exhaust system change at relatively high speed, which further increases the stressing of the catalytic-converter carrier element.

SUMMARY OF THE INVENTION

It is accordingly an object of the invention to provide a non-cylindrical catalytic-converter carrier element and tool, and method for manufacturing it that overcome the hereinafore-mentioned disadvantages of the heretofore-known devices and methods of this general type and that can also be disposed in a flexible way in the exhaust system of an automobile with extremely restricted spatial conditions and that continuously withstands the thermal and dynamic stresses in the exhaust system. Furthermore, the method permits such a catalytic-converter carrier element to be manufactured easily and cost-effectively. The tool can be used to manufacture such a honeycomb element for a catalytic-converter carrier element with a non-cylindrical shape quickly, easily and economically.

With the foregoing and other objects in view, there is provided, in accordance with the invention, a method for manufacturing a catalytic-converter carrier element, including the steps of manufacturing at least one stack with a plurality of alternately disposed sheet metal layers having layer ends, shaping the at least one stack to form a metallic honeycomb element with a cylindrical shape, the cylindrical shape of the honeycomb element being formed by the layer ends, the sheet metal layers being structured to form cells through which a fluid can flow, and deforming the honeycomb element to produce an external shape different from the cylindrical shape.

The method according to the invention includes at least the following steps:
  at least one stack is manufactured with a plurality of alternately disposed sheet metal layers that are structured such that cells through which a fluid can flow are formed;
  the at least one stack is shaped to form a honeycomb element with a cylindrical shape; and
  the honeycomb element is deformed so that an external shape that differs from the cylindrical shape is produced.

In this context, it is, first, to be noted that the honeycomb element in question here is not formed from metal foils that are wound on in the shape of a spiral. Instead, a plurality of sheet metal layers, in particular, smooth layers and corrugated layers, are constructed such that the layer ends form the external shape of the honeycomb element. This means, in particular, that all the layer ends of the smooth layers and/or corrugated layers are disposed radially on the outside and, as such, on one hand, delimit the external shape of the honeycomb element and, at the same time, provide the possibility of securing each layer at both ends to a housing. Accordingly, the telescoping of the layers, such as can occur, in particular, with the spiral shape, is avoided. With respect to the configuration of such a honeycomb element, in particular, with regard to the configuration of the smooth layers and corrugated layers in relation to one another, reference is made at this point to documents WO 90/03220 (corresponding to U.S. Pat. No. 5,105,539 to Maus et al., U.S. Pat. No. 5,135,794 to Maus et al., U.S. Pat. No. 5,139,844 to Maus et al.), EP 0 245 737 (corresponding to U.S. Pat. No. 4,923,109 to Cyron, U.S. Pat. No. 4,832,998 to Cyron, U.S. Pat. No. 4,946,822 to Swars, and U.S. Pat. No. 4,803,189 to Swars), and EP 0 831 969 (corresponding to U.S. Pat. No. 6,505,396 B1 to Wieres and U.S. Pat. No. 6,049,961 to Wieres), the disclosed contents of which are hereby completely incorporated herewith by reference. These publications describe, in particular, an S-shaped, a U-shaped, and a V-shaped configuration of the smooth layers and corrugated layers.

After stacking the smooth layers and corrugated layers, substantially linear cells that extend over the entire length of the stack are formed. The at least one stack is, then, at least partially bent, wound, or wrapped so that, overall, a honeycomb element with a cylindrical shape is formed. Cylindrical shape is understood here substantially to refer to the configuration of the lateral face of the honeycomb element, which face, preferably, include all the layer ends of the smooth layers and corrugated layers. The fact that the stack is, first, shaped to form a cylindrical element has the advantage that a relatively homogeneous stress can be brought about within the honeycomb element, and known and proven tools, devices, and methods can be used. A high level of process reliability has already been achieved with such tools, devices, and methods within the scope of an automated fabrication system. When the honeycomb element is manufactured with the cylindrical element, end sides that have a predefinable surface area are already defined. The sides are substantially circular and have a specific diameter.

Then, by deforming the cylindrical element, an external shape of the honeycomb element that differs from the cylindrical element is produced. It is necessary to take into account, in the process, the fact that the surface area of the end faces does not change before and after the deformation of the honeycomb element, that is to say, remains substantially constant. The deformation is, preferably, carried out by the lateral face of the element so that, for example, oval, elliptical, or other external shapes are produced after the deformation. In the process, preferably, only an at least partial relative displacement of the smooth layers and corrugated layers with respect to one another takes place, in particular, without deformation of the cell structure or of the cell density. To ensure that, despite this relative displacement of the corrugated layers and smooth layers with respect to one another, their layer ends are disposed near to the lateral face of the honeycomb element, it is, under certain circumstances, advantageous to embody the smooth layers and corrugated layers with different lengths (length in the radial direction of the honeycomb element).

The previously described method is particularly simple and cost-effective. Due to the fact that the honeycomb element is deformed independently of the housing, only small forces are necessary to manufacture virtually any desired external shapes of the catalytic-converter carrier element as long as certain limits of deformability are not exceeded. Typically deviations from the cylindrical shape of 10% to 20% of the cylinder diameter can be achieved satisfactorily. As a result, the catalytic-converter carrier elements can be adapted easily to the corresponding spatial conditions in small-scale devices or in the engine compartment or near to the underbody of an automobile. Hitherto, in the specialist field, it had been assumed that the cross-sectional shape of completely filled honeycomb elements could not be significantly deformed, but, rather, that the elements had to be manufactured directly with the desired end shape.

In accordance with another mode of the invention, the element is deformed by a force that acts on a lateral face of the element, the force being, preferably, applied distributed unevenly over a circumference of the lateral face. To prevent the cell structure from being changed or the corrugated layers from being compressed, the force is applied initially only in a predefined circumferential section, the layers moving out into circumferential regions that are spaced apart from them as a result of a relative movement between them. At the same time, it is possible to detect a reduction in the initial diameter of the cylindrical shape in the direction of the application of force.

In accordance with a further mode of the invention, the element is deformed by a tool having an input cross-section and an output cross-section, the input cross-section being substantially circular and the output cross-section corresponding to a cross-section with the external shape to be fabricated. The element is guided through the tool from the input cross-section to the output cross-section. The tool has a constant internal face, here, so that the cylindrical element is converted to the desired external shape of the honeycomb element in a non-damaging way. Such a method step is particularly simple and cost-effective because the prepared honeycomb element with its cylindrical shape merely has to be pushed through the tool or the tool has to be guided over the honeycomb element. An elliptical, oval or other shape is, accordingly, brought about by a simple relative displacement of the tool and honeycomb element.

In accordance with an added mode of the invention, the smooth layers and the corrugated layers are bent into an S shape at least in the case of the cylindrical element, this S-shaped configuration of the smooth layers and corrugated layers also, preferably, being present after the deformation of the element. With respect to the manufacture of honeycomb elements with layers that are bent into an S shape, reference is made at this point to U.S. Pat. No. 4,923,109 to Cyron, the contents of which are hereby completely incorporated herein by reference.

In accordance with an additional mode of the invention, the cylindrical element is only partially deformed so that the external shape that differs from the cylindrical element is formed only in one region in the direction of an axis of the honeycomb element. This means, in other words, that the honeycomb element has substantially a cylindrical shape in one region, while the remaining region is embodied with an external shape that differs therefrom (oval, elliptical, or the like). In this respect, it is particularly advantageous that the element is guided through only partially into a tool with a different inlet cross-section and outlet cross-section and, subsequently, led out again in the opposite direction. As a result of this fabrication step, a plurality of different external shapes can be manufactured easily.

In accordance with yet another mode of the invention, there are provided the steps of providing a tool with an inlet cross-section and outlet cross-section different from the inlet cross-section and guiding the cylindrical shape only partially into the tool in a first direction and subsequently leading the shape out again in a second direction opposite the first direction.

In accordance with yet a further mode of the invention, the external shape of the honeycomb element is, then, introduced at least partially into a casing tube. The casing tube, itself, is formed, preferably, in one piece, the internal boundary face corresponding substantially to the external shape of the honeycomb element. This means also that, preferably, all the layer ends of the smooth layers and corrugated layers are in contact with the casing tube so that the external shape is, then, no longer changed.

Now, the honeycomb element that has been at least partially introduced into the casing tube is provided with a solder and, then, subjected to thermal treatment to generate jointed connections between the smooth layers and the corrugated layers, as well as, preferably, also between the honeycomb element and the casing tube.

With the objects of the invention in view, there is also provided a method for manufacturing a catalytic-converter carrier element including a metallic honeycomb element constructed from a plurality of sheet metal layers having layer ends, the layer ends forming an external shape of the honeycomb element, including the steps of manufacturing at least one stack with a plurality of alternately disposed sheet metal layers to form a metallic honeycomb element with a cylindrical shape and to form cells through which a fluid can flow and deforming the honeycomb element to produce an external shape different from the cylindrical shape.

With the objects of the invention in view, there is also provided a catalytic-converter carrier element, including a metallic honeycomb element having a plurality of smooth layers and corrugated layers with layer ends forming an external shape of the honeycomb element, the smooth and corrugated layers defining cells extending through the honeycomb element, a first end side with a first surface area, and a second end side with a second surface area, the first end side and the second end side having, in absolute terms, an identical surface area, but being non-congruent.

With the objects of the invention in view, there is also provided a catalytic-converter carrier element manufactured according to the above method including a metallic honeycomb element having a plurality of smooth layers and corrugated layers with layer ends forming an external shape of the honeycomb element, the smooth and corrugated layers defining cells extending through the honeycomb element, a first end side with a first surface area, and a second end side with a second surface area, the first end side and the second end side having, in absolute terms, an identical surface area, but being non-congruent.

According to a further aspect of the invention, a catalytic-converter carrier element is proposed that is manufactured, in particular, using the method described above. This catalytic-converter carrier element includes a metallic honeycomb element with cells that extend therethrough, the honeycomb element including a plurality of smooth layers and corrugated layers with layer ends. The layers are constructed such that the layer ends form an external shape of the honeycomb element and the honeycomb element has a first end side with a first surface area and a second end side with a second surface area. The catalytic-converter carrier element is distinguished by the fact that the first end side and the second end side have, in absolute terms, an identical surface area, but are non-congruent. This means, for example, that the first end side is oval and the second end side is circular. Both end sides have the same surface area, but the external edges of the end sides would intersect if they were superimposed directly. As already explained in the method described above, such a honeycomb element can, first, have a cylindrical region that is adjoined directly by, for example, an oval region. Such catalytic-converter carrier elements are suitable, in particular, to be disposed in connecting elements of exhaust gas pipes, for example. Regions of the exhaust gas lines with changes in the cross-sectional shape can be, then, used as a catalytically active region in the exhaust system by using such a catalytic-converter carrier element in the system.

With the objects of the invention in view, there is also provided a catalytic-converter carrier element, including a metallic honeycomb element having a stack of alternately disposed smooth sheet metal layers and corrugated sheet metal layers, the smooth and corrugated sheet metal layers having layer ends forming an external shape of the honeycomb element, the smooth and corrugated layers defining cells extending through the honeycomb element through which a fluid can flow, a first end side being substantially circular and having a first surface area, and a second end side having a second surface area equal to the first surface area but non-congruent thereto.

It is particularly advantageous that the catalytic-converter carrier element has a first end face with a maximum extent and a minimum extent, and the second end face is embodied so as to be round with a constant diameter, the maximum extent and the minimum extent differing from the diameter by 30% at maximum. The delimitation of the "incongruency" is intended to ensure that the smooth layers and corrugated layers do not tend to crease or tear during the deformation, as has been described, above, for example, with respect to the method. Embrittling of material or work-hardening may, thus, be effectively prevented to achieve a long service life of the catalytic-converter carrier element under the high thermal stresses later when the device is in use. For this reason, a deviation of the diameter of less than 25%, in particular, less than 20%, and advantageously, less than 15% is preferred. At this point it is to be noted that the "incongruency" is not exclusively as a result of fabrication tolerances, therefore, lying in the low percentage region (for example, less than 5%, preferably, less than 2%, in particular, less than 1%).

With the objects of the invention in view, there is also provided a tool for manufacturing a metallic honeycomb element having an external shape to be fabricated for a catalytic-converter carrier element, including a tool body having an interior cavity and the interior cavity defining an input orifice having a substantially circular input cross-section, defining an output orifice having an output cross-section corresponding to the external shape of the element to be fabricated, and defining a channel through which the element is guided through the tool from the input cross-section to the output cross-section to convert the element from a cylindrical shape into an external shape different from the cylindrical shape.

According to yet another aspect of the invention, a tool for manufacturing a metallic honeycomb element for a catalytic-converter carrier element is proposed that is suitable for manufacturing the catalytic-converter carrier element, in particular, in conjunction with the method proposed above. The tool is used to convert a metallic honeycomb element with a cylindrical element into an external shape that differs from it. The tool is characterized in that it is embodied with an input cross-section and an output cross-section, the input cross-section being substantially circular and the output cross-section corresponding to a cross-section with the external shape to be fabricated. The honeycomb element can be guided through the tool from the input cross-section to the output cross-section. It is advantageous, here, that the output cross-section has a maximum width and a minimum width, and the input cross-section has a dimension, the maximum width and the minimum width differing from the dimension by 30% at maximum. The internal face of the tool from the output cross-section to the input cross-section is, preferably, continuous, that is to say, substantially linear contours are used to avoid excessive deformation or relative displacement of the smooth layers or corrugated layers. It is, under certain circumstances, advantageous here to make the deviation of the widths with respect to the dimensions of the input cross-section less than 20%, if appropriate, even less than 15%. Here, too, it is generally possible to assume different input and output cross-sections if the deviation between the widths has left the region of fabrication tolerances.

Other features that are considered as characteristic for the invention are set forth in the appended claims.

Although the invention is illustrated and described herein as embodied in a non-cylindrical catalytic-converter carrier element and tool, and method for manufacturing it, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is an elevational view of an end of a first embodiment of a honeycomb element according to the invention with a cylindrical shape;

FIG. 2 is an elevational view of the honeycomb element of FIG. 1 with an elliptical external shape;

DESCRIPTION OF THE PREFERRED EMBODIMENTS

Figure 3A:
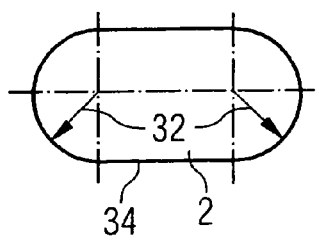
FIGS. 3A, 3B, 3C are diagrammatic cross-sectional views of further embodiments of an external shape of honeycomb elements according to the invention.

Referring now to the figures of the drawings in detail and first, particularly to FIG. 1 thereof, there is shown a schematic plan view of an embodiment of a honeycomb element 2 with a cylindrical shape 9. The honeycomb element 2 includes a plurality of smooth layers 3 and corrugated layers 4, only one smooth layer 3 and one corrugated layer 4 being illustrated by way of example in FIG. 1. The smooth layers 3 and corrugated layers 4 are disposed around wrapping points 28, the layer ends 5 of the smooth layers 3 and corrugated layers 4 all being disposed radially on the outside so that they form the lateral face 10 of the honeycomb element 2. The honeycomb element 2 with its cylindrical shape 9 has a diameter 24 and a circumference 11, and the honeycomb element 2 can also be described by two main axes 29, one main axis 29 extending through the wrapping points 28 and the second main axis 29 being disposed at an axial angle 30 of 90° with respect to the first main axis 29.

While FIG. 1 represents the cylindrical shape before deformation, FIG. 2 shows the external shape 6 of the honeycomb element 2 after deformation. The external shape 6 is, here, elliptical. Parallel to the main axis 29, the honeycomb element 2, then, has a maximum extent 22 and a minimum extent 23. The maximum extent 22 and the minimum extent 23 differ here from the diameter 24 with the cylindrical shape 9 by 30% at maximum. With the manufacturing method proposed here, it is possible to manufacture, in particular, a honeycomb element in which it is possible to detect a specific configuration of the wrapping points 28 in relation to the maximum extent 22 in the direction of the second main axis 29. The wrapping points 28, in fact, lie outside the second main axis 29 that forms the maximum extent 22. In particular, the wrapping points 28 lie outside an angle 31 of aperture of more than 10°, in particular, more than 40°, preferably, more than 90°.

FIG. 3A is a schematic view of an external shape of the honeycomb element that is referred to as "racetrack". This shape has two semicircles with a constant radius 32, which are connected by a linearly extending section 34.

Figure 3B:
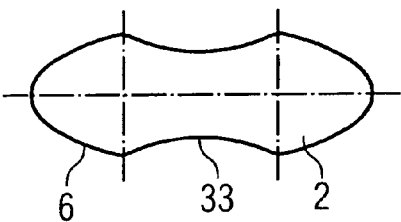

A further embodiment of the honeycomb element 2 is illustrated in FIG. 3B, in which the external shape is formed by two, for example, elliptical edge regions that are connected to a curvature 33 by a section. The curvature 33 may be oriented here in the same direction or else in the opposite direction (as illustrated).

Figure 3C:
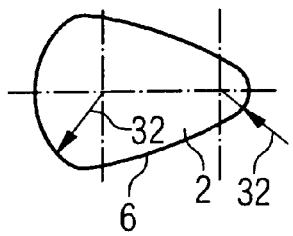

FIG. 3C shows an external shape according to an oval. The external shape 6 is illustrated here as a closed planar curve whose curvature is positive overall. The opposite apex regions have different radii 32.

The external shapes 6 that are illustrated in FIGS. 3A, 3B and 3C merely constitute a basis for a plurality of variants that readily suggest themselves to a person skilled in the art from the illustrations, in particular, it is possible to combine individual features of the configurations shown with one another.

Figure 4A:
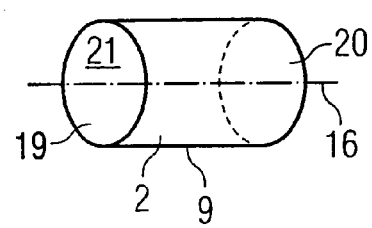
FIGS. 4A, 4B, 4C are diagrammatic perspective views of various alternative embodiments of an external shape of honeycomb elements according to the invention.

FIG. 4A shows a honeycomb element 2 with a cylindrical shape 9. The honeycomb element 2 has round end sides with a predefined surface area 21. The cells 8 (not illustrated in FIG. 4A) extend between the end sides 19 and 20 substantially parallel to an axis 16.

Figure 4B:
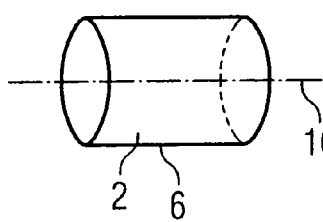

FIG. 4B shows a deformed honeycomb element 2 with an external shape 6 that has an oval cross-section.

Figure 4C:
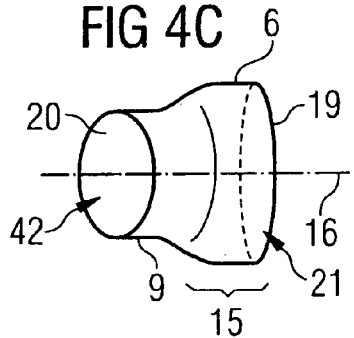

FIG. 4C shows an only partially deformed honeycomb element 2. Near to a first end side 19 with a first surface area 21, the honeycomb element 2 has an, for example, elliptical external shape 6 over a region 15 in the direction of the axis 16. In a region between the second end side 20 with the second surface area 42 and the deformed region 15, the honeycomb element 2 is embodied with a cylindrical shape 9.

Figure 5:
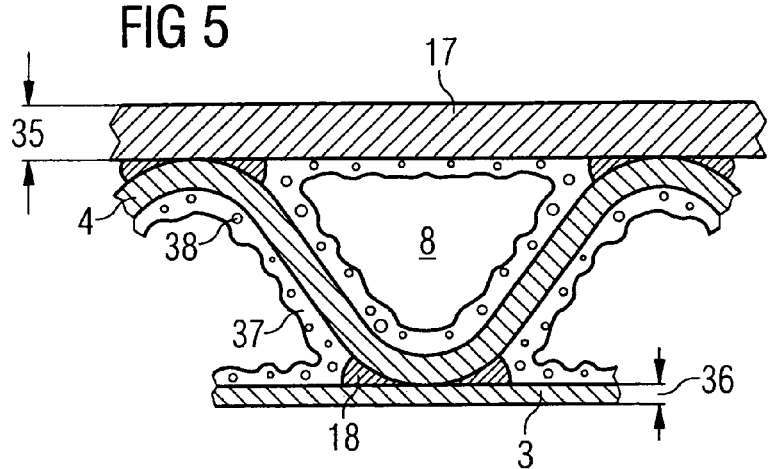
FIG. 5 is an enlarged, diagrammatic, cross-sectional view of a detail of a catalytic-converter carrier element according to the invention.

FIG. 5 is a schematic view of a detail of an embodiment of a catalytic-converter carrier element. The boundary region between the honeycomb element 2 and casing tube 17 is illustrated here. The honeycomb element 2 includes smooth layers 3 and corrugated layers 4 that are disposed in the interior of the casing tube 17. Cells 8, which extend substantially parallel to the axis 16, are formed by the structure of the corrugated layers 4. The layers 3, 4 have jointed connections 18 with one another, and the layers 3, 4 have jointed connections 18 with the casing tube 17, the connections 18 being embodied, in particular, as a soldered connection. The layers 3, 4 are generally high-temperature-proof and corrosion-proof metal foils (including at least the elements chromium, aluminum, iron) and each has a layer thickness 36 that is, preferably, less than 30 μm, in particular, less than 20 μm, and, preferably, less than 15 μm. The (metallic) casing tube 17 has a casing thickness 35 that is made greater than the layer thickness, in particular, the casing thickness lies in a region from 0.8 mm to 2 mm. The cells 8 or the layers 3, 4 have a coating 37 with catalytic converters 38 that are intended to accelerate chemical conversion of the pollutants contained in the exhaust gas and initiate this conversion even at relatively low temperatures (approximately 300° C.).

Figure 6:
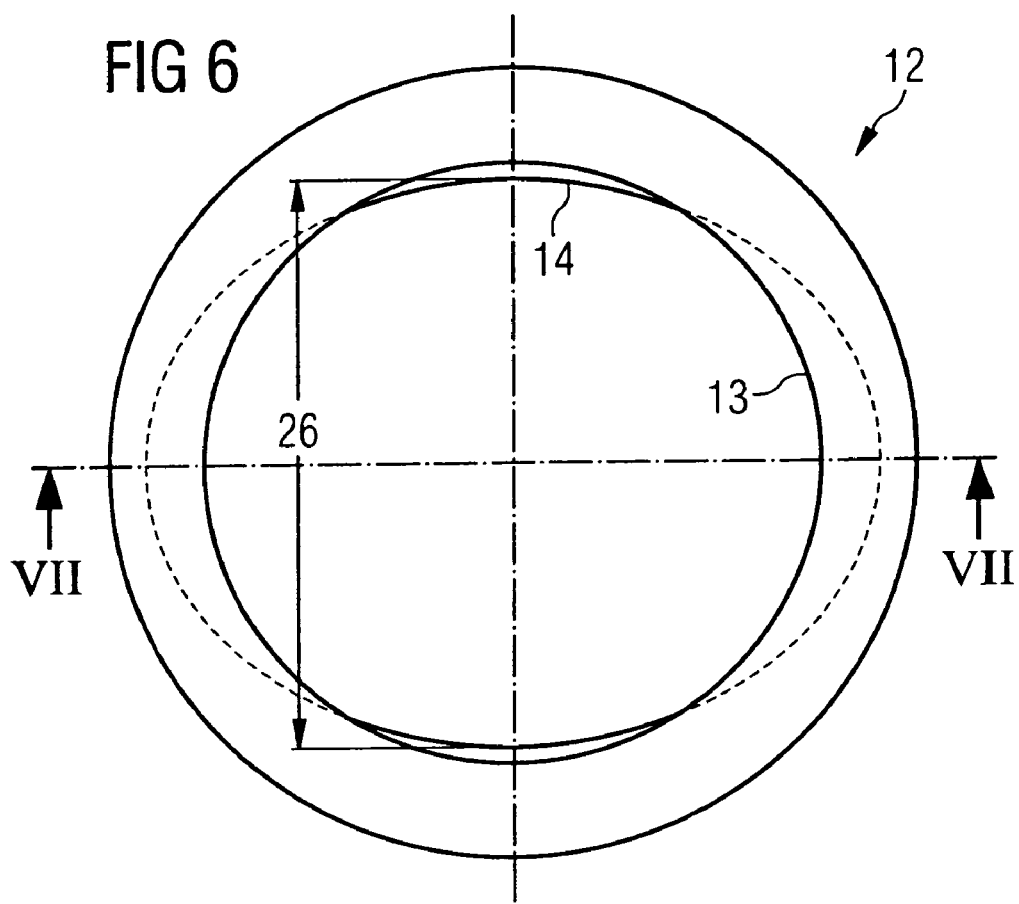
FIG. 6 is a plan view of a tool according to the invention.
Figure 7:
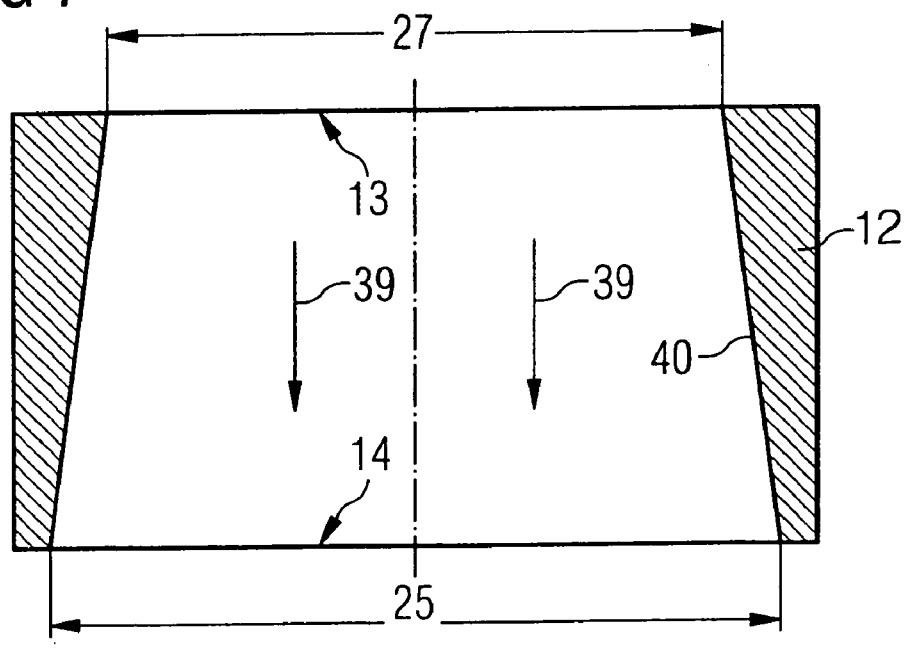
FIG. 7 is a cross-sectional view of the tool of FIG. 6.

FIGS. 6 and 7 show an embodiment of a tool 12 for manufacturing a catalytic-converter carrier element 1. In the illustrated embodiment, the tool 12 is annular and has a substantially round input cross-section 13 and a virtually elliptical output cross-section 14. The circular input cross-section 13 is described unambiguously by the dimension 27. The maximum width 25 and the minimum width 26 are used to describe the elliptical shape of the output cross-section 14. The shaping or deformation of the non-illustrated honeycomb element 2 are carried out such that the element 2 is initially secured by the substantially circular input cross-section 13 as it is pushed through the tool 12. By virtue of the fact that the honeycomb element is forced or pushed further in the direction of the arrows 39, the layers or layer ends are forced into the desired external shape by the internal face 40 of the tool 12. If the catalytic-converter carrier element that is to be manufactured is to have a cross-section that is uniform in construction over the entire axial length, the element is to be pushed completely through the tool 12 in the direction of the arrows 39 and is to be removed at the output cross-section 14.

FIGS. 8A to 8D are schematic views of illustrating an embodiment of the method for manufacturing a catalytic-converter carrier element 1.

Figure 8A:
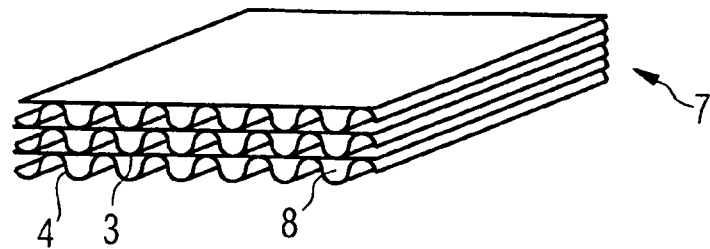
FIG. 8A is a fragmentary perspective view of a stack for manufacturing a deformed honeycomb element according to the method of the invention.

In the first step shown in FIG. 8A, smooth layers 3 and corrugated layers 4 are alternately disposed to form a stack 7 such that cells 8 through which exhaust gas can flow are formed.

Figure 8B:
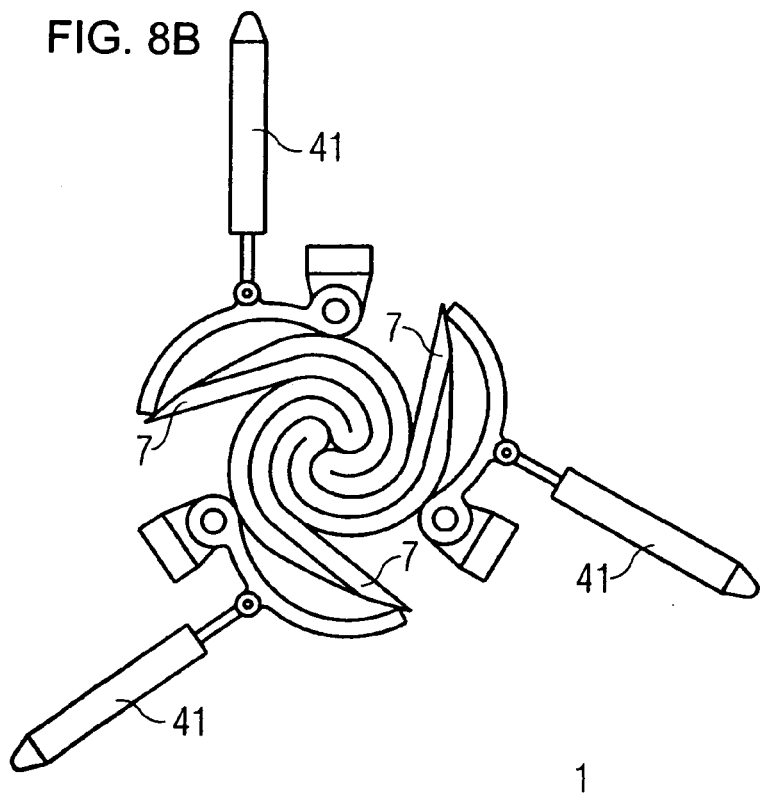
FIG. 8B is a diagrammatic, plan view of a tool for manufacturing a deformed honeycomb element according to the method of the invention.
Figure 8C:
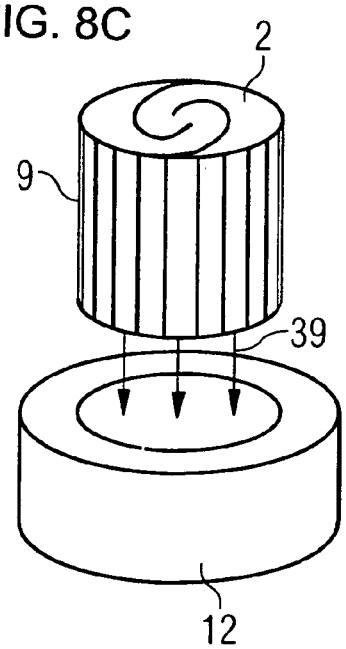
FIG. 8C is a perspective view of a honeycomb element and a tool for manufacturing a deformed honeycomb element according to the method of the invention.

Then, as illustrated in FIG. 8B, a plurality of stacks 7 is shaped into a cylindrical honeycomb element 2 by shaped segments 41.

Figure 8D:
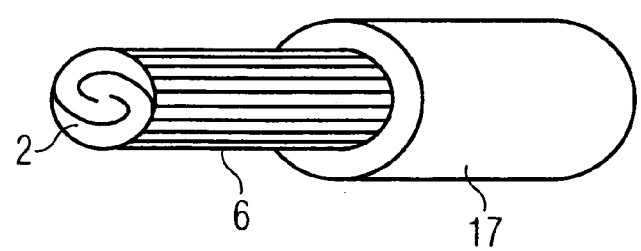
FIG. 8D is a diagrammatic perspective view of a deformed honeycomb element formed according to the method of the invention with the tool according to the invention.

The cylindrical shape 9 so formed is, then, pushed through a tool 12 in the direction of the arrows 39 (see FIG. 8C) so that an external shape 6 of the honeycomb element 2 that differs from the cylindrical shape is produced (see FIG. 8D).

According to the last step, the honeycomb element 2 with the external shape 6 is, then, at least partially inserted into a casing tube 17 not illustrated in FIG. 8D. The catalytic-converter carrier element 1 that is so prepared can, then, be provided with adhesive and/or solder, and its components can be aligned with one another and subjected to thermal treatment.

I claim:

1. A method for manufacturing a catalytic-converter carrier element, which comprises:

manufacturing at least one stack with a plurality of alternately disposed sheet metal layers having layer ends;

shaping the at least one stack to form a metallic honeycomb element with a cylindrical shape, the cylindrical shape of the honeycomb element being formed by the layer ends, the sheet metal layers being structured to form cells through which a fluid can flow;

providing a tool with an inlet cross-section and outlet cross-section different from the inlet cross-section; and deforming the honeycomb element to produce an external shape different from the cylindrical shape by guiding the honeycomb element at least partially through the tool from the inlet cross-section towards the outlet cross-section.

2. The method according to claim 1, which further comprises carrying out the constructing step by constructing the honeycomb element from a plurality of smooth layers and corrugated layers.

3. The method according to claim 2, which further comprises:

bending the smooth and corrugated layers in an approximate S-shape at least in the cylindrical shape; and at least partly retaining the S-shaped configuration of the smooth and corrugated layers after carrying out deformation of the honeycomb element.

4. The method according to claim 1, wherein the honeycomb element has a lateral face and which further comprises carrying out the deformation step with a force acting on the lateral face.

5. The method according to claim 1, wherein the honeycomb element has a lateral face and which further comprises carrying out the deformation step with application of a force distributed unevenly over a circumference of the lateral face.

6. The method according to claim 1, wherein the providing step further comprises:

providing a tool having an inlet cross-section that is substantially circular and an outlet cross-section corresponding to a cross-section of the shape to be fabricated; and carrying out the deformation step by guiding the honeycomb element through the tool from the inlet cross-section to the outlet cross-section.

7. The method according to claim 1, which further comprises deforming the cylindrical shape only partially to form the external shape different from the cylindrical shape only in one region in an axial direction of the honeycomb element.

8. The method according to claim 7, which further comprises:

guiding the cylindrical shape only partially into the tool in a first direction and subsequently leading the shape out again in a second direction opposite the first direction.

9. The method according to claim 1, which further comprises subsequently introducing the external shape of the honeycomb element at least partially into a casing tube.

10. The method according to claim 9, which further comprises carrying out the constructing step by constructing the honeycomb element from a plurality of smooth layers and corrugated layers;

providing the honeycomb element at least partially introduced into the casing tube with a solder; and subsequently subjecting the introduced element to thermal treatment to generate jointed connections between the smooth layers and the corrugated layers.

11. The method according to claim 10, which further comprises carrying out the thermal treatment step to generate jointed connections between the honeycomb element and the casing tube.

12. The method according to claim 1, which further comprises, after deforming the honeycomb element, introducing the deformed honeycomb element at least partially into a casing tube.

13. The method according to claim 12, which further comprises carrying out the constructing step by constructing the honeycomb element from a plurality of smooth layers and corrugated layers;

providing the honeycomb element at least partially introduced into the casing tube with a solder; and subsequently subjecting the introduced element to thermal treatment to generate jointed connections between the smooth layers and the corrugated layers.

14. The method according to claim 13, which further comprises carrying out the thermal treatment step to generate jointed connections between the honeycomb element and the casing tube.

15. A method for manufacturing a catalytic-converter carrier element including a metallic honeycomb element constructed from a plurality of sheet metal layers having layer ends, the layer ends forming an external shape of the honeycomb element, which comprises:

manufacturing at least one stack with a plurality of alternately disposed sheet metal layers to form a metallic honeycomb element with a cylindrical shape and to form cells through which a fluid can flow;

providing a tool with an inlet cross-section and outlet cross-section different from the inlet cross-section; and deforming the honeycomb element to produce an external shape different from the cylindrical shape by guiding the honeycomb element at least partially through the tool from the inlet cross-section towards the outlet cross-section.

16. The method according to claim 15, which further comprises carrying out the constructing step by constructing the honeycomb element from a plurality of smooth layers and corrugated layers.

* * * * *